US011710441B2

(12) United States Patent
Jin et al.

(10) Patent No.: US 11,710,441 B2
(45) Date of Patent: Jul. 25, 2023

(54) DISPLAY DEVICE, DRIVING APPARATUS FOR DISPLAY DEVICE, AND DRIVING METHOD OF DISPLAY DEVICE

(71) Applicant: Samsung Display Co., LTD., Yongin-si (KR)

(72) Inventors: Ja Kyoung Jin, Hwaseong-si (KR); Tae Jin Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/251,193

(22) PCT Filed: May 24, 2019

(86) PCT No.: PCT/KR2019/006279
§ 371 (c)(1),
(2) Date: Dec. 10, 2020

(87) PCT Pub. No.: WO2019/240401
PCT Pub. Date: Dec. 19, 2019

(65) Prior Publication Data

US 2021/0248950 A1 Aug. 12, 2021

(30) Foreign Application Priority Data

Jun. 12, 2018 (KR) ........................ 10-2018-0067552

(51) Int. Cl.
*G09G 3/20* (2006.01)
*G09G 3/36* (2006.01)
(Continued)

(52) U.S. Cl.
CPC ... *G09G 3/2092* (2013.01); *G09G 2300/0452* (2013.01); *G09G 2310/027* (2013.01); *G09G 2310/0278* (2013.01)

(58) Field of Classification Search
CPC ...... G09G 3/32; G09G 3/2011; G09G 3/2092; G09G 2300/0452; G09G 2310/027–0278; G02F 1/1345
See application file for complete search history.

(56) References Cited

U.S. PATENT DOCUMENTS 7,897,965 B2 3/2011 Yoon et al.
10,114,236 B2 10/2018 Kim et al.
(Continued)

FOREIGN PATENT DOCUMENTS

CN 103309501 A * 9/2013 ............. G06F 3/041
CN 105096875 A * 11/2015 ............... G09G 3/36
(Continued)

OTHER PUBLICATIONS

International Search Report—PCT/KR2019/006279 dated Sep. 20, 2019, citing references listed within.
(Continued)

*Primary Examiner* — Lin Li
(74) *Attorney, Agent, or Firm* — Cantor Colburn LLP

(57) ABSTRACT

A display device includes a display area including a plurality of pixels and a plurality of scan lines connected to the plurality of pixels, and a driving circuit portion that generates a compensation data voltage to compensate for a difference in length between the plurality of scan lines to input the compensation data voltage to a pixel disposed in a first area, based on start scan line information indicating a start of the first area including scan lines of the plurality of scan lines, and end scan line information indicating an end of the first area.

17 Claims, 12 Drawing Sheets

(51) Int. Cl.

| | |
|---|---|
| ***G09G 3/32*** | (2016.01) |
| ***G09G 5/14*** | (2006.01) |
| ***G02F 1/133*** | (2006.01) |
| ***G06F 3/041*** | (2006.01) |

(56) References Cited

U.S. PATENT DOCUMENTS

| | | | | |
|---|---|---|---|---|
| 10,386,658 | B2 | 8/2019 | Kim et al. | |
| 10,395,599 | B2 | 8/2019 | Noh et al. | |
| 10,802,299 | B2 | 10/2020 | Kim et al. | |
| 2007/0002188 | A1* | 1/2007 | Kumagai | G09G 3/2011 348/751 |
| 2010/0156945 | A1* | 6/2010 | Yoshida | G02F 1/1345 345/690 |
| 2014/0022229 | A1* | 1/2014 | Choi | G09G 3/3696 345/212 |
| 2016/0178836 | A1* | 6/2016 | Kim | G02B 6/0088 362/606 |
| 2016/0190228 | A1* | 6/2016 | Park | H01L 27/3276 257/40 |
| 2017/0301314 | A1* | 10/2017 | Kim | G09G 5/14 |
| 2018/0342194 | A1* | 11/2018 | Li | G09G 3/3677 |
| 2019/0235334 | A1* | 8/2019 | Wu | G09G 3/2092 |
| 2019/0278967 | A1* | 9/2019 | Shepelev | G09G 3/32 |

FOREIGN PATENT DOCUMENTS

| | | | | | |
|---|---|---|---|---|---|
| CN | 108469697 | A | * | 8/2018 | G02F 1/133 |
| CN | 108510940 | A | * | 9/2018 | G09G 3/3208 |
| JP | 200969768 | | | 4/2009 | |
| JP | 2017535815 | | | 11/2017 | |
| KR | 100599470 | | | 7/2006 | |
| KR | 100721944 | | | 5/2007 | |
| KR | 1020090088577 | A | | 8/2009 | |
| KR | 1020160083371 | | | 7/2016 | |
| KR | 1020160084925 | | | 7/2016 | |
| KR | 1020170045393 | | | 4/2017 | |
| KR | 1020170102148 | A | | 9/2017 | |
| KR | 1020180018930 | A | | 2/2018 | |
| KR | 1020190041046 | | | 4/2019 | |

OTHER PUBLICATIONS

Written Opinion—PCT/KR2019/006279 dated Sep. 20, 2019, citing references listed within.

* cited by examiner

FIG. 4

134

| | Type | Access | D7 | D6 | D5 | D4 | D3 | D2 | D1 | D0 | Hex |
|---|---|---|---|---|---|---|---|---|---|---|---|
| ID | Command | RW | 0 | 0 | 0 | 0 | 0 | 1 | 0 | 1 | 0x05 |
| SSC | 1st para | RW | SSC[7] | SSC[6] | SSC[5] | SSC[4] | SSC[3] | SSC[2] | SSC[1] | SSC[0] | 0xFA |
| | | | 1 | 1 | 1 | 1 | 1 | 0 | 1 | 0 | |
| | 2nd para | RW | | | | | SSC[11] | SSC[10] | SSC[9] | SSC[8] | 0x00 |
| | | | | | | | 0 | 0 | 0 | 0 | |
| ESC | 3rd para | RW | ESC[7] | ESC[6] | ESC[5] | ESC[4] | ESC[3] | ESC[2] | ESC[1] | ESC[0] | 0x06 |
| | | | 0 | 0 | 0 | 0 | 0 | 1 | 1 | 0 | |
| | 4th para | RW | | | | | ESC[11] | ESC[10] | ESC[9] | ESC[8] | 0x09 |
| | | | | | | | 1 | 0 | 0 | 1 | |

DISPLAY DEVICE, DRIVING APPARATUS FOR DISPLAY DEVICE, AND DRIVING METHOD OF DISPLAY DEVICE

This application is a national stage application of International Patent Application No. PCT/KR2019/006279 which claims priority to Korean Patent Application No. 10-2018-0067552, filed on Jun. 12, 2018, and all the benefits accruing therefrom under 35 U.S.C. § 119, the content of which in its entirety is herein incorporated by reference.

BACKGROUND

(a) Field

Embodiments of the invention relate to a display device, a driving apparatus for the display device, and a driving method of the display device, and more particularly, to a display device including scan lines of different lengths, a driving apparatus for the display device, and a driving method of the display device.

(b) Description of the Related Art

Generally, a display area in which an image is displayed in a display device is formed in a substantially quadrangular shape, and a plurality of pixels, and a plurality of scan lines and a plurality of data lines connected to the plurality of pixels are disposed in the display area. The display device sequentially applies a scan signal to the plurality of scan lines, and applies a data voltage to the plurality of data lines corresponding to the scan signals.

Recently, a display device including a display panel formed of a display area having a polygonal or circular shape that is not quadrangular is being developed. Such a display panel may be bent, folded, or rolled, and may be manufactured as a display device that may be combined with a three-dimensional supporter to display images on multiple surfaces.

SUMMARY

When a display area is formed in a polygonal or circular shape, a plurality of scan lines may have a non-uniform length, and an area including a relatively long scan line may be provided. A scan signal may be delayed and inputted to a pixel connected to a relatively long scan line, and a data voltage may not be normally inputted to a corresponding pixel. Accordingly, when a data voltage of the same gray is inputted to a pixel connected to a relatively long scan line and a pixel connected to a relatively short scan line, a difference in luminance may occur due to a difference in length of the scan lines.

Embodiments of the invention have been made in an effort to provide a display device, a driving apparatus for the display device, and a driving method of the display device that prevents a difference in luminance that may occur due to a difference in length of scan lines in a display panel.

An embodiment of the invention provides a display device including a display area including a plurality of pixels and a plurality of scan lines connected to the plurality of pixels, and a driving circuit portion that generates a compensation data voltage which compensates for a difference in length between the plurality of scan lines to input the compensation data voltage to a pixel of the plurality of pixels disposed in a first area, based on start scan line information indicating a start of the first area including scan lines of the plurality of scan lines, and end scan line information indicating an end of the first area.

In an embodiment, a length of the scan lines included in the first area may be relatively long compared to a length of a scan line of the plurality of scan lines disposed in a second area excluding the first area in the display area.

In an embodiment, the driving circuit portion may include a register including the start scan line information and the end scan line information, and a data generator which generates the compensation data voltage.

In an embodiment, the driving circuit portion may receive an image signal, may input a general data voltage corresponding to the image signal to a pixel of the plurality of pixels disposed in a second area excluding the first area in the display area, and may input the compensation data voltage generated by increasing or decreasing a general data voltage corresponding to the image signal to the pixel disposed in the first area.

In an embodiment, the driving circuit portion may input a general data voltage generated according to a reference gamma curve to a pixel of the plurality of pixels disposed in a second area excluding the first area in the display area, and may input the compensation data voltage generated according to a first gamma curve different from the reference gamma curve to the pixel disposed in the first area.

In an embodiment, the driving circuit portion may input a general data voltage generated according to a reference voltage curve representing a data voltage with respect to a gray to a pixel of the plurality of pixels disposed in a second area of the display area excluding the first area, and may input the compensation data voltage generated according to a first voltage curve different from the reference voltage curve to the pixel disposed in the first area.

In an embodiment, the driving circuit portion may include a first input bump group which indicates the start scan line information, and a second input bump group which indicates the end scan line information, and the first input bump group and the second input bump group may include a predetermined number of input bumps, while one of a ground voltage and a power source voltage may be inputted to each of the plurality of input bumps included in the first input bump group and the second input bump group.

Another embodiment of the invention provides a driving apparatus for a display device, including an input bump portion which receives an image signal, a data generator which generates a data voltage based on the image signal, an output bump portion which transmits the data voltage to a display area including a plurality of pixels and a plurality of scan lines connected to the plurality of pixels, and a register including start scan line information indicating a start of a first area including scan lines of the plurality of scan lines and end scan line information indicating an end of the first area.

In an embodiment, the data generator may increase or decrease a general data voltage corresponding to the image signal and generate a compensation data voltage to input the compensation data voltage to a pixel of the plurality of pixels disposed in the first area, and the compensation data voltage may compensate for a difference in length between the plurality of scan lines.

In an embodiment, the data generator may generate a compensation data voltage according to a first gamma curve different from a reference gamma curve for generating a general data voltage corresponding to the image signal to input the compensation data voltage to a pixel of the plurality of pixels disposed in the first area, and the compensation data voltage may compensate for a difference in length between the plurality of scan lines.

In an embodiment, the data generator may generate a general data voltage corresponding to the image signal according to a reference voltage curve representing a data voltage with respect to a gray to input the general data voltage to a pixel of the plurality of pixels disposed in a second area excluding the first area in the display area, and may generate a compensation data voltage according to a first voltage curve different from the reference voltage curve to input the compensation data voltage to a pixel of the plurality of pixels disposed in the first area, and the compensation data voltage may compensate for a difference in length between the plurality of scan lines.

Another embodiment of the invention provides a driving apparatus for a display device, including an input bump portion which receives an image signal, a data generator which generates a data voltage based on the image signal, and an output bump portion which transmits the data voltage to a display area including a plurality of pixels and a plurality of scan lines connected to the plurality of pixels, where the input bump portion includes a first input bump group including a predetermined number of input bumps of a plurality of input bumps which indicate start scan line information indicating a start of a first area including scan lines of the plurality of scan lines, and a second input bump group including a predetermined number of input bumps of the plurality of input bumps which indicate end scan line information indicating an end of the first area.

In an embodiment, the predetermined number of the input bumps included in the first input bump group may correspond to a number of bits of the start scan line information, and the predetermined number of the input bumps included in the second input bump group may correspond to a number of bits of the end scan line information.

In an embodiment, one of a ground voltage and a power source voltage may be inputted to each of the plurality of input bumps included in the first input bump group and the second input bump group, and the start scan line information and the end scan line information may be indicated with the ground voltage and the power source voltage.

Another embodiment of the invention provides a driving method of a display device, including receiving an image signal for displaying an image in a display area, checking a first scan section corresponding to an area including a relatively long scan line among the display area, converting an image signal corresponding to the first scan section among the image signals into first group data, converting an image signal corresponding to a second scan section excluding the first scan section in the display area into second group data, inputting the first group data to a plurality of pixels included in the first scan section while a scan signal of a gate-on voltage is applied to a scan line included in the first scan section, and inputting the second group data to a plurality of pixels included in the second scan section while a scan signal of a gate-on voltage is applied to a scan line included in the second scan section, where the first group data and the second group data include different data voltages with respect to a same gray.

In an embodiment, in the display area, a length of the scan line included in the first scan section and a length of the scan line included in the second scan section may be different from each other.

In an embodiment, the checking the first scan section may include checking the first scan section from a register including start scan line information indicating a start of the first scan section and end scan line information indicating an end of the first scan section.

In an embodiment, the checking the first scan section may include checking start scan line information and end scan line information indicated by a ground voltage and a power source voltage inputted to a first input bump group and a second input bump group that include a predetermined number of input bumps.

In an embodiment, the first group data may include a compensation data voltage compensated by increasing or decreasing a general data voltage corresponding to the image signal, and the second group data may include a general data voltage corresponding to the image signal.

In an embodiment, the first group data may include a general data voltage corresponding to the image signal, and the second group data may include a compensation data voltage compensated by increasing or decreasing a general data voltage corresponding to the image signal.

It is possible to prevent a difference in luminance that may occur due to a difference in length of scan lines in a display panel, and to improve display quality of a display device.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 4 illustrates an embodiment of a register included in the driving circuit portion of FIG. 3.

DETAILED DESCRIPTION

Figure 1:
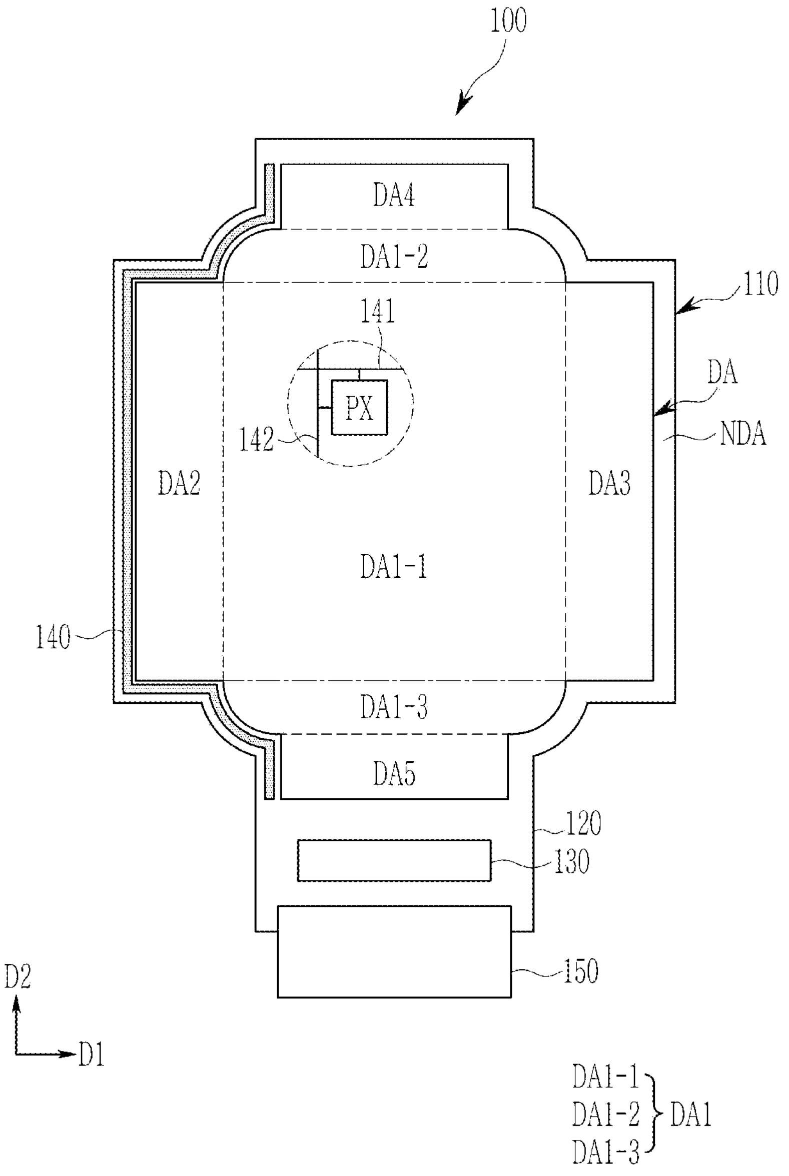
FIG. 1 illustrates a top plan view of an embodiment of a display device according to the invention.

Embodiments of the invention will be described more fully hereinafter with reference to the accompanying drawings, in which embodiments of the invention are shown. As those skilled in the art would realize, the described embodiment may be modified in various different ways, all without departing from the spirit or scope of the present.

In order to clearly describe the invention, parts that are irrelevant to the description are omitted, and identical or similar constituent elements throughout the specification are denoted by the same reference numerals.

In addition, unless explicitly described to the contrary, the word "comprise" and variations such as "comprises" or "comprising" will be understood to imply the inclusion of stated elements but not the exclusion of any other elements.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, a display device in an embodiment of the invention will be described with reference to FIGS. 1 to 7. First, a display device that may display an image on multiple surfaces thereof by combining a display panel with a three-dimensional support member will be described with reference to FIGS. 1, 2A and 2B.

Figure 2A:
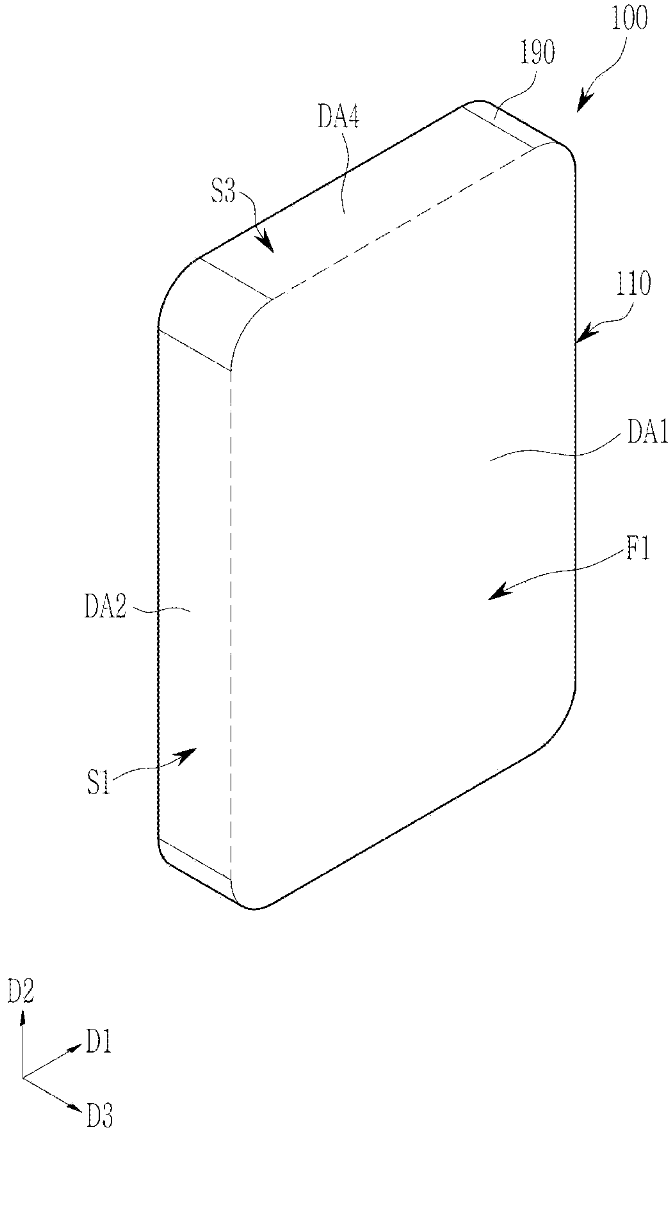
FIGS. 2A and 2B illustrate perspective views of an embodiment of a state in which the display device of FIG. 1 is coupled to a three-dimensional support member.
Figure 2B:
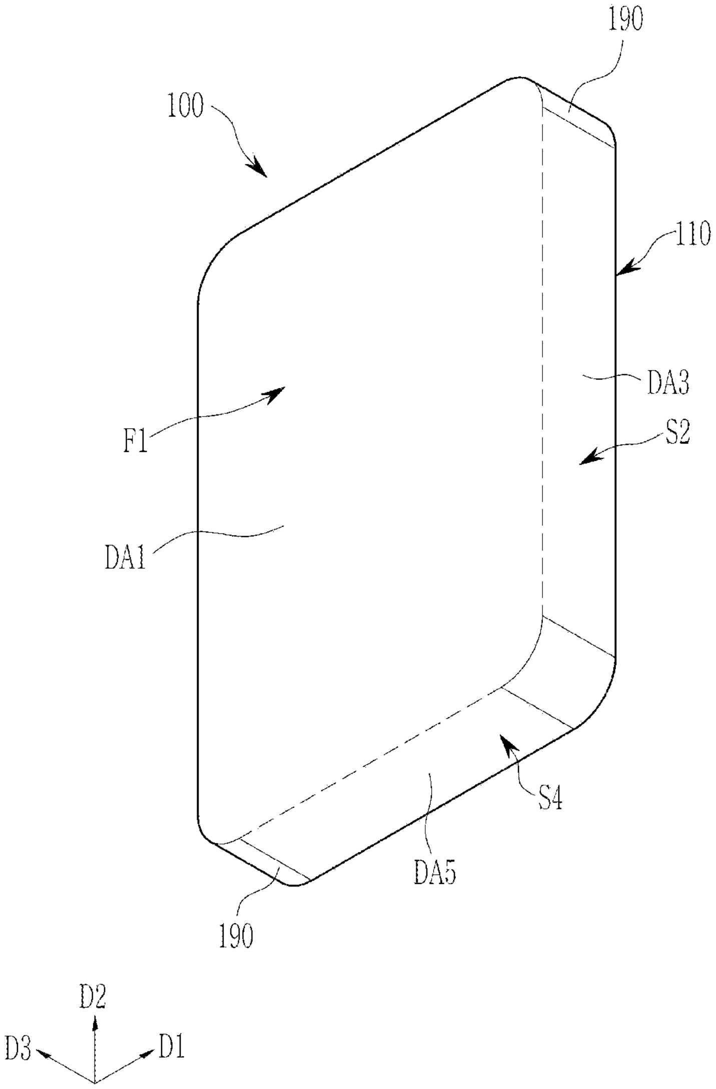

FIG. 1 illustrates a top plan view of an embodiment of a display device according to the invention. FIGS. 2A and 2B illustrate perspective views of an embodiment of a state in which the display device of FIG. 1 is coupled to a three-dimensional support member.

Referring to FIGS. 1, 2A and 2B, FIG. 1 illustrates a case in which a display panel 110 is unfolded in a form of a developed view in a plan view parallel to a first direction D1 and a second direction D2. FIGS. 2A and 2B illustrate a state in which the display panel 110 is coupled to a three-dimensional support member 190. The support member 190 may be substantially hexahedral, and components such as a circuit board and a battery for driving a display device 100 may be accommodated inside the support member 190. The second direction D2 may be perpendicular to the first direction D1. A third direction D3 may be perpendicular to a plane parallel to the first direction D1 and the second direction D2.

The display device 100 includes the display panel 110, a driving circuit portion 130, and a printed circuit board ("PCB") 150. The driving circuit portion 130 is a driving apparatus for the display device 100, and may be disposed on the display panel 110. The PCB 150 may be connected to the display panel 110.

The display panel 110 includes a substrate 120, a display area DA including a plurality of pixels PX disposed on the substrate 120, a non-display area NDA disposed around the display area DA, and a scan driver 140 disposed in the non-display area NDA. The non-display area NDA may be an area of the substrate 120 excluding the display area DA.

The display area DA includes the plurality of pixels PX, a plurality of scan lines 141 connected to the plurality of pixels PX, and a plurality of data lines 142 connected to the plurality of pixels PX. The plurality of pixels PX may be arranged in a substantial matrix form in the display area DA. The plurality of scan lines 141 may substantially extend in the first direction (or a row direction) to be substantially parallel to each other. The plurality of data lines 142 may substantially extend in the second direction (or a column direction) to be substantially parallel to each other. In FIG. 1, only one pixel PX, and one scan line 141 and one data line 142 connected to the pixel PX, are illustrated so that FIG. 1 is not complicated.

Each of the plurality of pixels PX may emit one color light among primary colors or white light. In an embodiment, the primary colors may include three primary colors such as red, green, and blue, for example. In another embodiment, the primary colors may include three primary colors such as yellow, cyan, and magenta, for example. An image may be displayed by a combination of light emitted from the plurality of pixels PX.

The display area DA may include a first display area DA1, a second display area DA2, a third display area DA3, a fourth display area DA4, and a fifth display area DA5.

The first display area DA1 may correspond to a front surface F1 of the display device 100. That is, the first display area DA1 may be an area for displaying an image on the front surface F1 of the display device 100. The first display area DA1 may be a substantially quadrangular area. The first display area DA1 may be a quadrangular area with rounded vertices in which four vertices are respectively provided in a shape of a quarter circle. The first display area DA1 may include a fixed width display area DA1-1, a first variable width display area DA1-2, and a second variable width display area DA1-3. The fixed width display area DA1-1 is an area having a constant width in the first direction D1 by being disposed between both edges of the first display area DA1 extending in the second direction D2. The first variable width display area DA1-2 is an area that is disposed between two rounded vertices facing each other in the first direction D1 such that a width thereof in the first direction D1 decreases toward the second direction D2. The second variable width display area DA1-3 is an area that is disposed between two other rounded vertices facing each other in the first direction D1 such that a width thereof in the first direction D1 increases toward the second direction D2. The first variable width display area DA1-2 and the second variable width display area DA1-3 may face each other with the fixed width display area DA1-1 interposed therebetween.

The second display area DA2 may correspond to a first side surface 51 of the display device 100. That is, the second display area DA2 may be an area for displaying an image on the first side surface 51 of the display device 100. The second display area DA2 may be a quadrangular area that shares an edge extending in the second direction D2 of the fixed width display area DA1-1 as an edge of the second display area DA2. The second display area DA2 may be folded into the first side surface 51 of the display device 100 based on an edge shared with the fixed width display area DA1-1.

The third display area DA3 may correspond to a second side surface S2 of the display device 100. That is, the third display area DA3 may be an area for displaying an image on the second side surface S2 of the display device 100. The second side surface S2 may face the first side surface 51. The third display area DA3 may be a quadrangular area that shares another edge extending in the second direction D2 of the fixed width display area DA1-1 as an edge of the third display area DA3. The third display area DA3 may be folded into the second side surface S2 of the display device 100 based on an edge shared with the fixed width display area DA1-1.

The fourth display area DA4 may correspond to a third side surface S3 of the display device 100. That is, the fourth display area DA4 may be an area for displaying an image on the third side surface S3 of the display device 100. The third side surface S3 may be disposed between the first side surface 51 and the second side surface S2. The fourth display area DA4 may be a quadrangular area that shares an edge of the first variable width display area DA1-2 extending in the first direction D1 and not overlapping an edge of the fixed width display area DA1-1 as an edge of the fourth display area DA4. The fourth display area DA4 may be folded into the third side surface S3 of the display device 100 based on an edge shared with the first variable width display area DA1-2.

The fifth display area DA5 may correspond to a fourth side surface S4 of the display device 100. That is, the fifth display area DA5 may be an area for displaying an image on the fourth side surface S4 of the display device 100. The fourth side surface S4 may be disposed between the first side surface 51 and the second side surface S2, and may face the third side surface S3. The fifth display area DA5 may be a quadrangular area that shares an edge of the second variable width display area DA1-3 extending in the first direction D1 and not overlapping an edge of the fixed width display area DA1-1 as an edge of the fifth display area DA5. The fifth display area DA5 may be folded into the fourth side surface S4 of the display device 100 based on an edge shared with the second variable width display area DA1-3.

In some embodiments, one of the second display area DA2 and the third display area DA3 may be omitted. In addition, one of the fourth display area DA4 and the fifth display area DA5 may be omitted.

The substrate 120 may be a flexible substrate including plastic that may be bent, folded, or rolled. The substrate 120 may be provided in a shape cut along an edge of the display area DA including the first to fifth display areas DA1, DA2, DA3, DA4, and DA5.

The scan driver 140 may be disposed along one edge of the display area DA. In an embodiment, the scan driver 140 may be disposed in the non-display area NDA along a left edge of the fourth display area DA4, the first variable width display area DA1-2, the second display area DA2, the second variable width display area DA1-3, and the fifth display area DA5, for example. The scan driver 140 may be connected to a plurality of scan lines 141, and may apply a scan signal configured of a combination of a gate-on voltage and a gate-off voltage to the plurality of scan lines 141.

The PCB 150 is connected to the display panel 110 in the non-display area NDA. The PCB 150 outputs an image signal and an input control signal that control displaying of the image to the driving circuit portion 130. In an embodiment, the PCB 150 may include a flexible printed circuit ("FPC"), for example.

The driving circuit portion 130 may be disposed in the non-display area NDA of the substrate 120. The driving circuit portion 130 may be disposed between the fifth display area DA5 and the PCB 150. In an embodiment, the driving circuit portion 130 may include a driving integrated circuit ("IC"), and the driving IC may be disposed (e.g., mounted) on the substrate 120 as a chip on plastic ("COP"), for example. The driving circuit portion 130 may generate an image signal and a data voltage corresponding to the image signal based on an input control signal to output it to the display area DA, and may output a scan control signal that controls an operation of the scan driver 140 to the scan driver 140. In FIG. 1, one driving circuit portion 130 is illustrated, but the number of driving circuit portions 130 is not limited.

The driving circuit portion 130 may apply a general data voltage generated according to a reference gamma curve to some portions of the display area DA, and may apply a compensation data voltage generated according to a first gamma curve or a second gamma curve different from the reference gamma curve to some other portions of the display area DA. The first gamma curve may be a gamma curve for displaying an image having higher luminance than that of the reference gamma curve with respect to an image signal of the same gray, and the second gamma curve may be a gamma curve for displaying an image having lower luminance than that of the reference gamma curve with respect to the same gray. In an alternative embodiment, the driving circuit portion 130 may differently output a data voltage applied to some portions of the display area DA and a data voltage applied to some other portions of the display area DA to an image signal of the same gray. This will be described in more detail with reference to FIGS. 4 to 7.

Hereinafter, the driving circuit portion 130 will be described in more detail with reference to FIG. 3, and an embodiment for preventing a luminance difference that may occur due to a difference in length of scan lines 141 in the display panel 110 will be described with reference to FIGS. 4 to 7.

Figure 3:
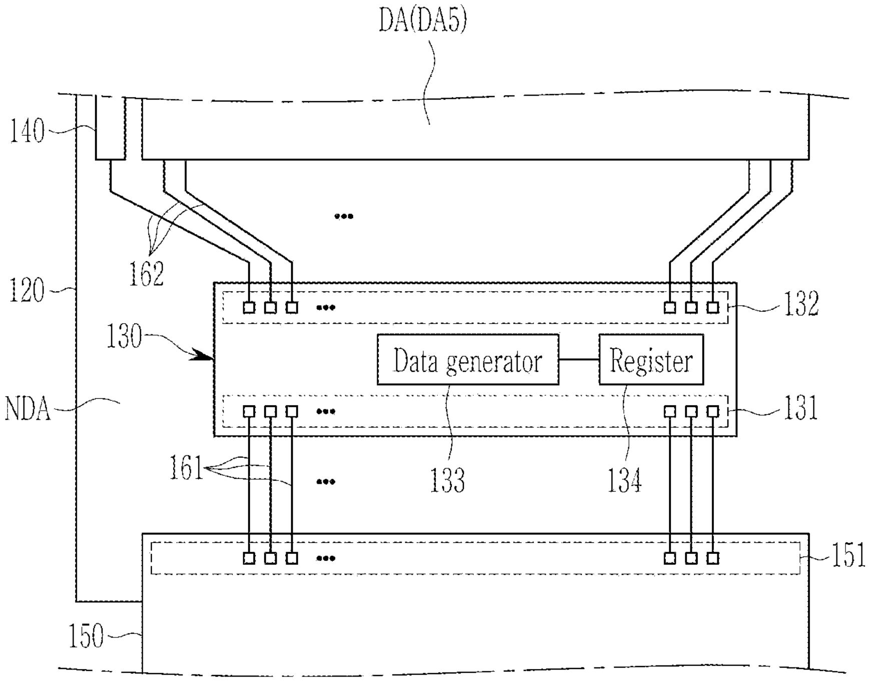
FIG. 3 illustrates an embodiment of a driving circuit portion included in the display device of FIG. 1 and a connection structure thereof.

FIG. 3 illustrates an embodiment of a driving circuit portion included in the display device of FIG. 1 and a connection structure thereof.

Referring to FIG. 3, the driving circuit portion 130 includes an input bump portion 131 for receiving an image signal and an input control signal from the PCB 150, an output bump portion 132 for transmitting a signal such as a data voltage to the display area DA, a data generator 133 for generating a data voltage based on an image signal and an input control signal, and a register 134 for indicating some portions of the display area DA.

The input bump portion 131 includes a plurality of input bumps arranged at intervals along one edge of the driving circuit portion 130 facing the printed circuit board 150. The output bump portion 132 includes a plurality of output bumps arranged at intervals along the other edge of the driving circuit portion 130 facing the display area DA.

A plurality of input wires 161 and a plurality of output wires 162 are disposed in the non-display area NDA of the substrate 120. The plurality of input wires 161 electrically connects an output pad portion 151 of the printed circuit board 150 and the input bump portion 131 of the driving circuit portion 130. The plurality of output wires 162 electrically connects the output bump portion 132 of the driving circuit portion 130 and the display area DA. In addition, at least one of the plurality of output wires 162 electrically connects the output bump portion 132 of the driving circuit portion 130 and the scan driver 140. Some of the plurality of output wires 162 may be connected to a plurality of data lines 142 disposed in the display area DA.

By disposing an anisotropic conductive film ("ACF") (not shown) on the plurality of input wires 161 and the plurality of output wires 162, and disposing and compressing the driving circuit portion 130 on the ACF, the input bump portion 131 of the driving circuit portion 130 may be electrically connected to the plurality of input wires 161, and the output bump portion 132 of the driving circuit portion 130 may be electrically connected to the plurality of output wires 162.

The output pad portion 151 of the printed circuit board 150 may also be electrically connected to the plurality of input wires 161 by the ACF. That is, by disposing an ACF (not shown) on the plurality of input wires 161, and by disposing and compressing the printed circuit board 150 on the ACF, the output pad portion 151 of the printed circuit board 150 may be electrically connected to the plurality of input wires 161.

An image signal and an input control signal outputted through the output pad portion 151 of the printed circuit board 150 may be transmitted to the driving circuit portion 130 through the plurality of input wires 161. The image signal includes luminance information of each pixel PX, and the luminance includes a predetermined number of gray levels. The image signal may be a digital signal.

The data generator 133 may generate a data voltage based on the image signal and the input control signal. In some embodiments, the data generator 133 may generate a scan control signal. The scan control signal is transmitted to the scan driver 140, and the scan driver 140 may sequentially output the scan signal having a gate-on voltage to the plurality of scan lines 141 according to the scan control signal.

The register 134 may include information indicating a first area of the display area DA to which a compensation data voltage is to be applied. The register 134 may include information on a scan line in which the first area starts among the plurality of scan lines 141 and information on a scan line in which the first area ends among the plurality of scan lines 141. That is, the first area may be separated along the scan line 141 in the display area DA. The data generator 133 may compensate the data voltages for the plurality of pixels PX connected to the scan line between the scan line where the first area starts and the scan line where the first area ends, thereby generating a compensation data voltage. In addition, when a gate-on voltage is applied to the scan line included in the first area, the data generator 133 may apply a corresponding compensation data voltage to the plurality of data lines 142 to input the compensation data voltage to the plurality of pixels PX included in the first area. The data generator 133 may generate a general data voltage corresponding to an image signal for the plurality of pixels PX connected to the scan line included in the second area except for the scan line included in the first area, and when a gate-on voltage is applied to the scan line included in the second area, the data generator 133 may apply the corresponding general data voltage to the plurality of data lines 142 to input the general data voltage to the plurality of pixels PX included in the second area. The compensation data voltage may be a data voltage for compensating for a length difference between the plurality of scan lines 141, and the general data voltage may be a data voltage that does not compensate for a length difference between the scan lines 141.

In another embodiment, the register 134 may include information indicating a second area of the display area DA to which the general data voltage that is not compensated is to be applied. The register 134 may include information on a scan line in which the second area starts among the plurality of scan lines 141, and information on a scan line in which the second area ends among the plurality of scan lines 141. That is, the second area may be separated along the scan line 141 in the display area DA. The data generator 133 may compensate the data voltages for the plurality of pixels connected to the scan line included in the first area excluding the scan line between the scan line where the second area starts and the scan line where the second area ends, thereby generating a compensation data voltage. In addition, when a gate-on voltage is applied to the scan line included in the first area excluding the scan line included in the second area, the data generator 133 may apply a corresponding compensation data voltage to the plurality of data lines 142 to input the compensation data voltage to the plurality of pixels PX included in the first area. The data generator 133 may generate a general data voltage corresponding to an image signal for the plurality of pixels PX connected to the scan line included in the second area, and when a gate-on voltage is applied to the scan line included in the second area, the data generator 133 may apply the corresponding general data voltage to the plurality of data lines 142 to input the general data voltage to the plurality of pixels PX included in the second area.

Figure 6:
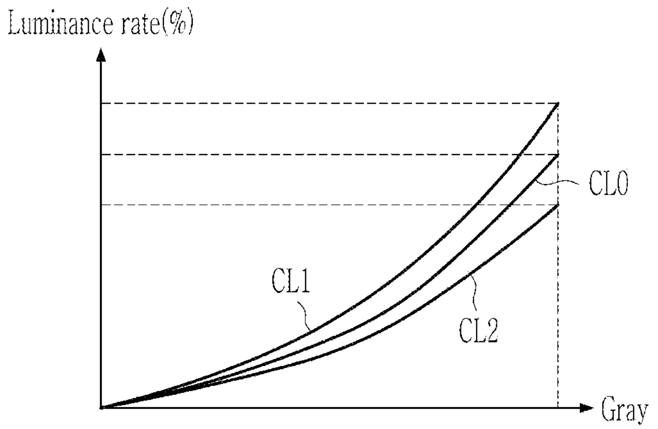
FIG. 6 illustrates an embodiment of a gamma curve used to generate a data voltage inputted to the display device of FIG. 1.

The data generator 133 may generate a general data voltage according to a reference gamma curve (refer to CL0 in FIG. 6), and may generate a compensation data voltage according to a first gamma curve (refer to CL1 in FIG. 6) or a second gamma curve (refer to CL2 in FIG. 6). In an alternative embodiment, the data generator 133 may generate a general data voltage according to a reference voltage curve (refer to CV0 in FIG. 7) representing a data voltage with respect to a gray, and may generate a compensation data voltage according to a first voltage curve (refer to CV1 in FIG. 7) or a second voltage curve (refer to CV2 in FIG. 7). The data generator 133 may generate a compensation data voltage by increasing or decreasing a general data voltage corresponding to an image signal. That is, the compensation data voltage and the general data voltage may have different voltage values, with respect to the same gray.

Figure 5:
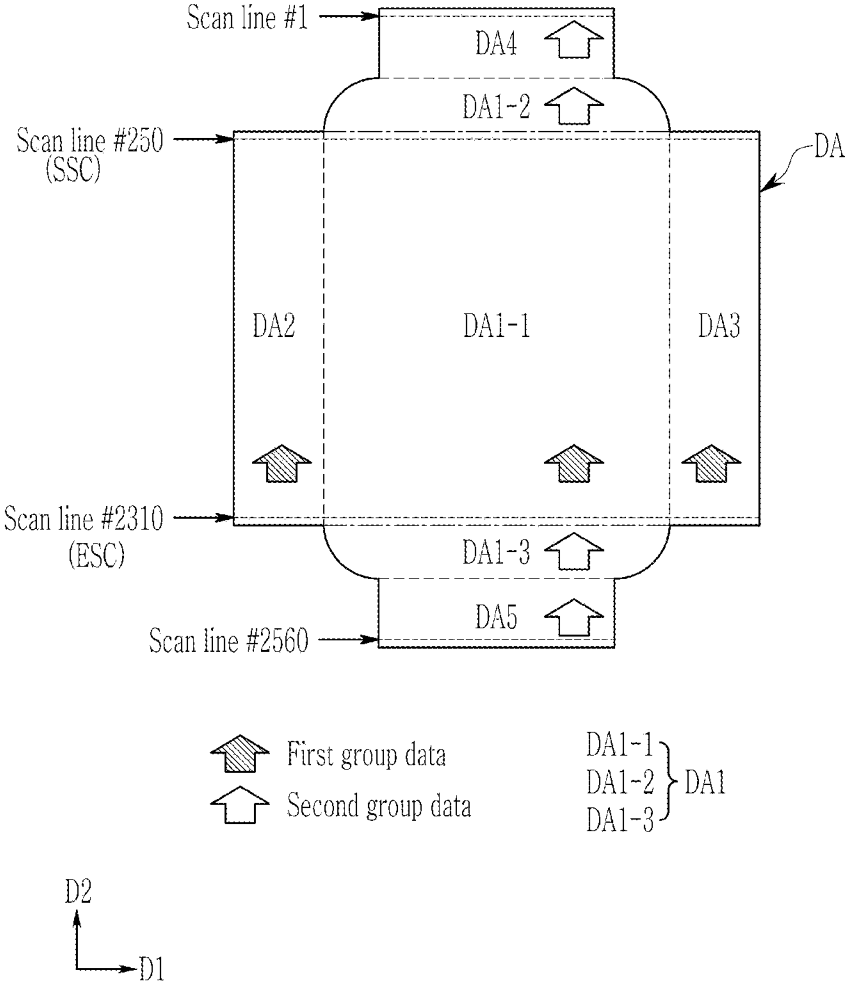
FIG. 5 illustrates an embodiment of a method of inputting a data voltage to a display area according to the register of FIG. 4.
Figure 7:
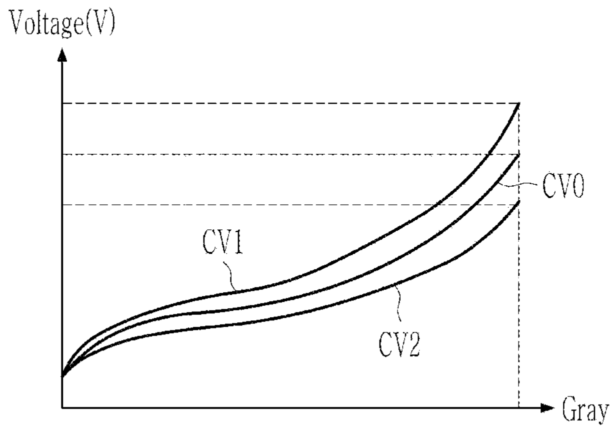
FIG. 7 illustrates an embodiment of a graph of a data voltage with respect to a gray used to generate a data voltage inputted to the display device of FIG. 1.

Hereinafter, an embodiment of a register will be described with reference to FIG. 4, and a method of inputting, by a register, a data voltage to a display area will be described with reference to FIGS. 5 to 7.

FIG. 4 illustrates an embodiment of a register included in the driving circuit portion of FIG. 3. FIG. 5 illustrates an embodiment of a method of inputting a data voltage to a display area according to the register of FIG. 4. FIG. 6 illustrates an embodiment of a gamma curve used to generate a data voltage inputted to the display device of FIG. 1. FIG. 7 illustrates an embodiment of a graph of a data voltage with respect to a gray used to generate a data voltage inputted to the display device of FIG. 1.

Referring to FIG. 4, the register 134 includes identification information ID, start scan line information SSC, and end scan line information ESC. The register 134 may be configured so that the identification information ID, the start scan line information SSC, and the end scan line information ESC may be read and written ("RW") in binary.

The identification information ID is for identifying the register 134, and may be for identifying a specific register 134 among various registers that may be included in the driving circuit portion 130. The identification information ID may indicate whether the register 134 indicates the first area to which the compensation data voltage is to be applied or whether the register 134 indicates the second area to which the general data voltage is to be applied.

The start scan line information SSC is information for indicating the scan line where the first area or the second area starts. That is, the start scan line information SSC may indicate the start of the first area or the second area. In an embodiment, the start scan line information SSC may indicate the scan line in a 12-digit binary number from SSC[0] to SSC[11], for example.

The end scan line information ESC is information for indicating the scan line where the first area or the second area ends. That is, the end scan line information ESC may indicate the end of the first area or the second area. In an embodiment, the end scan line information ESC may indicate the scan line in a 12-digit binary number from ESC[0] to ESC[11], for example.

In FIG. 4, the start scan line information SSC indicates a 250-th scan line as "000011111010", and the end scan line information ESC indicates a 2310-th scan line as "100100000110". That is, the first area or the second area includes a 250-th scan line to a 2310-th scan line.

A case in which the number of the plurality of scan lines 141 included in the display area DA described above with reference to FIG. 1 is 2560 will be described as an example with reference to FIG. 5. In this case, the fourth display area DA4 and the first variable width display area DA1-2 include scan lines from a first scan line to a 249-th scan line. The fixed width display area DA1-1, the second display area DA2, and the third display area DA3 include scan lines from a 250-th scan line to a 2310-th scan line. In addition, the second variable width display area DA1-3 and the fifth display area DA5 include scan lines from a 2311-th scan line to a 2560-th scan line.

The scan lines from the 250-th scan line to the 2310-th scan line extend in the first direction D1 throughout the second display area DA2, the fixed width display area DA1-1, and the third display area DA3. The scan lines from the first scan line to the 249-th scan line extend in the first direction D1 throughout the fourth display area DA4 or the first variable width display area DA1-2, and the scan lines from the 2311-th scan line to the 2560-th scan line extend in the first direction D1 throughout the second variable width display area DA1-3 or the fifth display area DA5. A length of the scan lines from the 250-th scan line to the 2310-th scan line is relatively longer than that of the remaining scan lines.

When the length of the scan line becomes longer, the scan signal may be delayed and transmitted to the pixel PX, and accordingly, a period during which the data voltage may be inputted to the pixel PX may be shortened, and the data voltage may not be inputted to the pixel PX. Accordingly, a difference in luminance may occur with respect to the same image signal between an area having a relatively long scan line and the remaining area (an area having a relatively short scan line). However, a compensation data voltage for compensating for a length difference between the plurality of scan lines 141 may be generated such that a difference in luminance does not occur, by the register 134 of FIG. 4.

The register 134 of FIG. 4 indicates the 250-th scan line as the start scan line information SSC and the 2310-th scan line as the end scan line information ESC. That is, the register 134 may indicate the fixed-width display area DA1-1, the second display area DA2, and the third display area DA3 of the display area DA. The register 134 may indicate an area in which the scan line is relatively long. In this case, embodiments in which the driving circuit portion 130 generates and inputs the compensation data voltage for compensating for the length difference between the plurality of scan lines 141 are as follows.

A first embodiment is a case in which an area in which the length of the scan line indicated by the register 134 is relatively long is the first area to which the compensation data voltage is applied, and the first area is displayed at a relatively low luminance compared to the second area with respect to the same gray. In this case, the data generator 133 may read the information of the register 134, generate first group data inputted to the pixel PX disposed in the first area, and generate second group data inputted to the pixel PX disposed in the second area excluding the first area. The data generator 133 may generate the second group data according to the reference gamma curve CL0 illustrated in FIG. 6, and may generate the first group data according to the first gamma curve CL1 illustrated in FIG. 6. The first gamma curve CL1 has a higher luminance rate than the reference gamma curve CL0 with respect to the same gray. As the first group data is generated according to the first gamma curve CL1, a relatively low luminance of the first area compared to the luminance of the second area is compensated. That is, the first group data includes the compensation data voltage generated according to the first gamma curve CL1, and the second group data includes the general data voltage generated according to the reference gamma curve CL0. In an alternative embodiment, the data generator 133 may generate the second group data according to the reference voltage curve CV0 illustrated in FIG. 7, and may generate the first group data according to the first voltage curve CV1 illustrated in FIG. 7. The first voltage curve CV1 has a higher data voltage than the reference voltage curve CV0 with respect to the same gray. As the first group data is generated according to the first voltage curve CV1, the data voltage inputted to the pixel PX disposed in the first area increases, and accordingly, the relatively low luminance of the first area compared to the luminance of the second area is compensated. That is, the first group data may include the compensation data voltage generated according to the first voltage curve CV1, and the second group data may include the general data voltage generated according to the reference voltage curve CV0. In other words, the data generator 133 may increase the general data voltage corresponding to the image signal to generate the compensation data voltage.

A second embodiment is a case in which an area in which the length of the scan line indicated by the register 134 is relatively long is the first area to which the compensation data voltage is applied, and the first area is displayed at a relatively high luminance compared to the second area with respect to the same gray. In this case, the data generator 133 may read the information of the register 134, generate the first group data inputted to the first area, and generate the second group data inputted to the second area excluding the first area. The data generator 133 may generate the second group data according to the reference gamma curve CL0 illustrated in FIG. 6, and may generate the first group data according to the second gamma curve CL2 illustrated in FIG. 6. The second gamma curve CL2 has a lower luminance rate than the reference gamma curve CL0 with respect to the same gray. As the first group data is generated according to the second gamma curve CL2, a relatively high luminance of the first area compared to the luminance of the second area is compensated. That is, the first group data includes the compensation data voltage generated according to the second gamma curve CL2, and the second group data includes the general data voltage generated according to the reference gamma curve CL0. In an alternative embodiment, the data generator 133 may generate the second group data according to the reference voltage curve CV0 illustrated in FIG. 7, and may generate the first group data according to the second voltage curve CV2 illustrated in FIG. 7. The second voltage curve CV2 has a lower data voltage than the reference voltage curve CV0 with respect to the same gray. As the first group data is generated according to the second voltage curve CV2, the data voltage inputted to the pixel PX disposed in the first area decreases, and accordingly, a relatively high luminance of the first area compared to the luminance of the second area is compensated. That is, the first group data may include the compensation data voltage generated according to the second voltage curve CV2, and the second group data may include the general data voltage generated according to the reference voltage curve CV0. In other words, the data generator 133 may decrease the general data voltage corresponding to the image signal to generate the compensation data voltage.

A third embodiment is a case in which an area in which the length of the scan line indicated by the register 134 is relatively long is the second area to which the general data voltage is applied, the remaining area is the first area to which the compensation data voltage is applied, and the first area is displayed at a relatively low luminance compared to the second area with respect to the same gray. In this case, the data generator 133 may read the information of the register 134, generate the first group data inputted to the second area, and generate the second group data inputted to the first area. The data generator 133 may generate the first group data according to the reference gamma curve CL0 illustrated in FIG. 6, and may generate the second group data according to the first gamma curve CL1 illustrated in FIG. 6. As the second group data is generated according to the first gamma curve CL1, a relatively low luminance of the first area compared to the luminance of the second area is compensated. That is, the second group data includes the compensation data voltage generated according to the first gamma curve CL1, and the first group data includes the general data voltage generated according to the reference gamma curve CL0. In an alternative embodiment, the data generator 133 may generate the first group data according to the reference voltage curve CV0 illustrated in FIG. 7, and may generate the second group data according to the first voltage curve CV1 illustrated in FIG. 7. As the second group data is generated according to the first voltage curve CV1, the data voltage inputted to the pixel PX disposed in the first area increases, and accordingly, a relatively low luminance of the first area compared to the luminance of the second area is compensated. That is, the second group data may include the compensation data voltage generated according to the first voltage curve CV1, and the first group data may include the general data voltage generated according to the reference voltage curve CV0.

A fourth embodiment is a case in which an area in which the length of the scan line indicated by the register 134 is relatively long is the second area to which the general data voltage is applied, the remaining area is the first area to which the compensation data voltage is applied, and the first area is displayed at a relatively high luminance compared to the second area with respect to the same gray. In this case, the data generator 133 may read the information of the register 134, generate the first group data inputted to the second area, and generate the second group data inputted to the first area. The data generator 133 may generate the first group data according to the reference gamma curve CL0 illustrated in FIG. 6, and may generate the second group data according to the second gamma curve CL2 illustrated in FIG. 6. As the second group data is generated according to the second gamma curve CL2, a relatively high luminance of the first area compared to the luminance of the second area is compensated. That is, the second group data includes the compensation data voltage generated according to the second gamma curve CL2, and the first group data includes the general data voltage generated according to the reference gamma curve CL0. In an alternative embodiment, the data generator 133 may generate the first group data according to the reference voltage curve CV0 illustrated in FIG. 7, and may generate the second group data according to the second voltage curve CV2 illustrated in FIG. 7. As the second group data is generated according to the second voltage curve CV2, the data voltage inputted to the pixel PX disposed in the first area decreases, and accordingly, a relatively high luminance of the first area compared to the luminance of the second area is compensated. That is, the second group data may include the compensation data generated according to the second voltage curve CV2, and the first group data may include the general data voltage generated according to the reference voltage curve CV0.

As described above, it is possible to generate a compensation data voltage that may compensate for a difference in luminance due to a difference in length between the plurality of scan lines 141, by reading an area of the display area DA having a relatively long scan line length from the register 134 included in the driving circuit portion 130, and it is possible to prevent a difference in luminance due to a difference in length between the plurality of scan lines 141 from occurring, by inputting the compensation data voltage to the pixel PX included in an area having a relatively long scan line length or in the remaining area.

In the description above, it has been exemplified that the register 134 indicates the area having the relatively long scan line length, but the invention is not limited thereto, and the register 134 may indicate an area having a relatively short scan line length. Even in this case, as described above, it is possible to prevent the difference in luminance that may occur due to the difference in length between the plurality of scan lines 141, by reading the information of the register 134 to input the compensation data voltage to the pixel PX included in the area having the relatively long scan line length or in the remaining area (that is, the area having the relatively short scan line length.

Hereinafter, a driving circuit portion 130' in another embodiment of the invention will be described with reference to FIG. 8.

Figure 8:
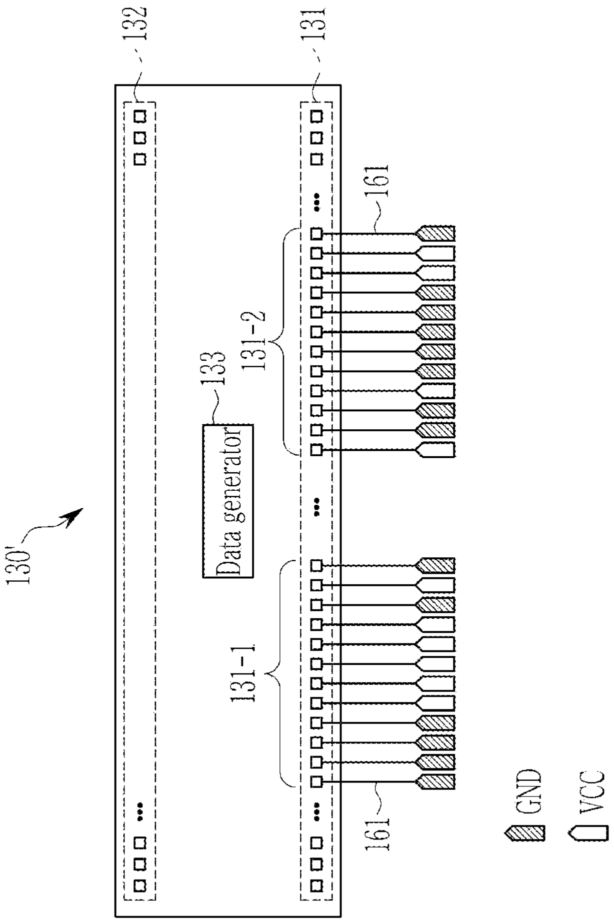
FIG. 8 illustrates another embodiment of a driving circuit portion included in the display device of FIG. 1.

FIG. 8 illustrates another embodiment of a driving circuit portion included in the display device of FIG. 1. Differences from the driving circuit portion 130 described above in FIG. 3 will be mainly described.

Referring to FIG. 8, an input bump portion 131 included in the driving circuit portion 130' may include a first input bump group 131-1 for indicating start scan line information SSC and a second input bump group 131-2 for indicating end scan line information ESC.

The first input bump group 131-1 and the second input bump group 131-2 may include a predetermined number of input bumps among a plurality of input bumps included in the input bump portion 131. The number of input bumps included in the first input bump group 131-1 may correspond to the number of bits desired to indicate the start scan line information SSC, and the number of input bumps included in the second input bump group 131-2 may correspond to the number of bits desired to indicate the end scan line information ESC. In an embodiment, when the start scan line information SSC and the end scan line information ESC are each indicated with 12 bits, each of the first input bump group 131-1 and the second input bump group 131-2 may include twelve input bumps, for example. One of a ground voltage GND and a power source voltage VCC may be inputted to each of a plurality of input bumps included in the first input bump group 131-1 and the second input bump group 131-2 through the input wire 161. The ground voltage GND may indicate zero in binary. The power source voltage VCC is a voltage of a different level from the ground voltage GND, and may indicate 1 in binary. Accordingly, the start scan line information SSC may be indicated in binary with the ground voltage GND and the power source voltage VCC inputted to a plurality of input bumps included in the first input bump group 131-1. In addition, the end scan line information ESC may be indicated in binary with the ground voltage GND and the power source voltage VCC inputted to a plurality of input bumps included in the second input bump group 131-2. FIG. 8 illustrates that "000011111010" is inputted as the start scan line information SSC to the first input bump group 131-1, and "100100000110" is inputted as the end scan line information ESC to the second input bump group 131-2.

The data generator 133 may read and compensate the start scan line information SSC inputted to the first input bump group 131-1 and the end scan line information ESC inputted to the second input bump group 131-2 to recognize the first area to which the compensation data voltage is to be applied or the second area to which the general data voltage is to be applied, and as described above in FIG. 5, the compensation data voltage and the general data voltage may be inputted to the plurality of pixels PX included in the display area DA.

When the data generator 133 may obtain the start scan line information SSC and the end scan line information ESC through the first input bump group 131-1 and the second input bump group 131-2, the register 134 described above in FIG. 3 may be omitted.

Except for the above-described differences, the features of the embodiment described above with reference to FIGS. 1 to 7 may be entirely applied to the embodiment described with reference to FIG. 8, so that redundant descriptions are omitted.

Hereinafter, a driving method of the display device described above in FIGS. 1 to 8 will be described with reference to FIG. 9.

Figure 9:
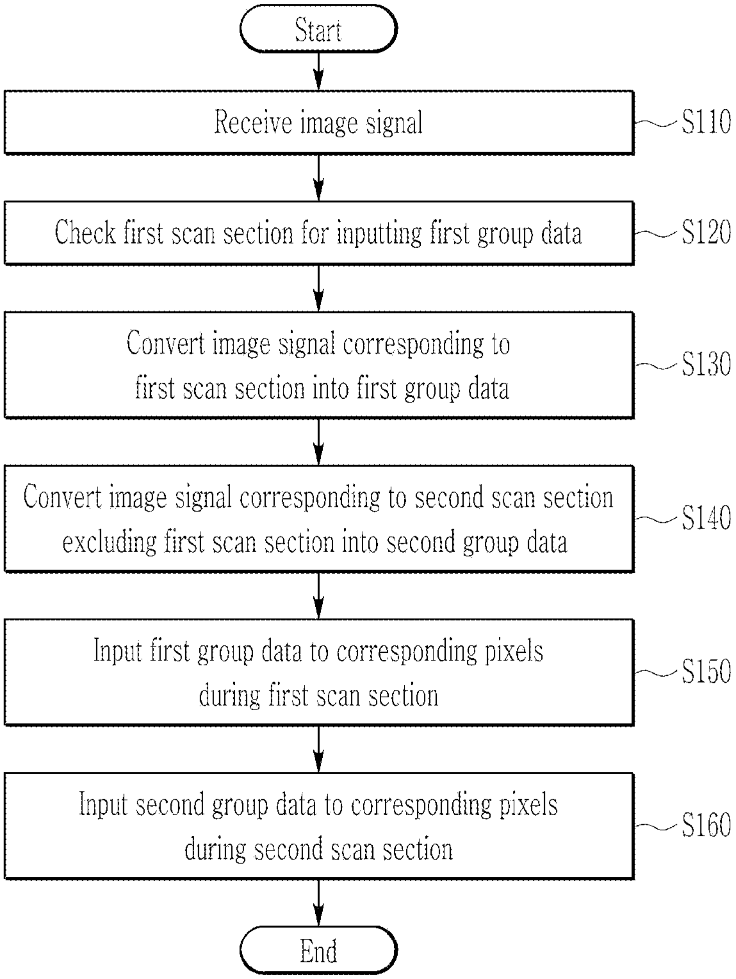
FIG. 9 illustrates a flowchart of an embodiment of a driving method of a display device according to the invention.

FIG. 9 illustrates a flowchart of an embodiment of a driving method of a display device according to the invention.

Referring to FIG. 9, the driving circuit portion 130 included in the display device 100 receives an image signal for displaying an image in the display area DA (S110). In this case, the display area DA of the display device 100 may display an image not only on the front surface F1 but also on at least one of the side surfaces 51, S2, S3, and S4.

The driving circuit portion 130 checks a first scan section for input of the first group data (S120). The driving circuit portion 130 may check the first scan section corresponding to an area having a relatively long length of the scan line 141 through the register 134 described above in FIGS. 3 and 4. In an alternative embodiment, the driving circuit portion 130 may check the first scan section from the ground voltage GND and the power source voltage VCC inputted to the first input bump group 131-1 and the second input bump group 131-2 described above in FIG. 8. In an embodiment, the first scan section may be the second display area DA2, the fixed width display area DA1-1, and the third display area DA3 illustrated in FIG. 5, for example.

The driving circuit portion 130 converts an image signal corresponding to the first scan section among received image signals into the first group data (S130). The first group data may include a compensation data voltage compensated by increasing or decreasing the general data voltage corresponding to the image signal. In an alternative embodiment, the first group data may include a general data voltage corresponding to the image signal. The driving circuit portion 130 may generate a compensation data voltage according to the first gamma curve CL1 or the second gamma curve CL2 described above in FIG. 6, or may generate a general data voltage according to the reference gamma curve CL0. In an alternative embodiment, the driving circuit portion 130 may generate a compensation data voltage according to the first voltage curve CV1 or the second voltage curve CV2 described above in FIG. 7, or may generate a general data voltage according to the reference voltage curve CV0.

The driving circuit portion 130 converts an image signal corresponding to a second scan section excluding the first scan section in the display area DA into second group data (S140). The second scan section may correspond to an area in which the length of the scan line 141 is relatively short. The second group data may include the general data voltage corresponding to the image signal. In an alternative embodiment, the second group data may include a compensation data voltage that compensates for the general data voltage corresponding to the image signal. The first group data and the second group data may include different data voltages with respect to the same gray.

When scan signals of a gate-on voltage are sequentially applied to the plurality of scan lines 141 connected to the plurality of pixels PX, while the scan signal of the gate-on voltage is applied to the scan line 141 included in the first scan section, the driving circuit portion 130 inputs the first group data to the plurality of pixels PX included in the first scan section (S150), and while the scan signal of the gate-on voltage is applied to the scan line 141 included in the second scan section, the driving circuit portion 130 inputs the second group data to the plurality of pixels PX included in the second scan section (S160).

One of the first group data and the second group data includes a compensation data voltage that may compensate for a difference in luminance that may occur according to a difference in length between the plurality of scan lines 141. Accordingly, it is possible to prevent the difference in luminance that may be caused by the difference in length between the plurality of scan lines 141.

In the description above, in the display device 100 that may display an image on multiple surfaces, the case where the length of scan line 141 is different in some portions of the display area DA has been described. In addition to the display device 100 that displays an image on multiple surfaces, even when the display area DA is polygonal or circular, an area with a relatively long scan line 141 may occur, and thus a difference in luminance may occur due to the difference in the length of the scan line. This will be described with reference to FIGS. 10 and 11. Differences from the display device 100 described above in FIGS. 1 to 8 will be mainly described.

Figure 10:
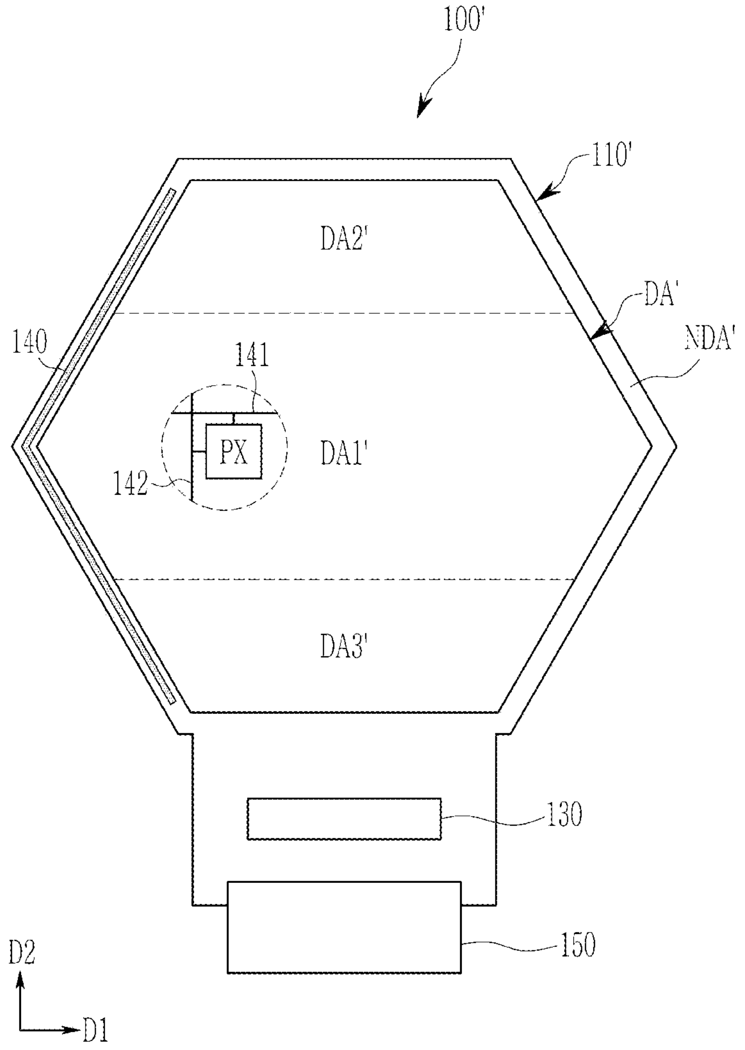
FIG. 10 illustrates a top plan view of another embodiment of a display device according to the invention.

FIG. 10 illustrates a top plan view of another embodiment of a display device according to the invention.

Referring to FIG. 10, a display device 100' may include a display panel 110', and the display panel 110' may include a display area DA' including a hexagonal (or polygonal) shape. A non-display area NDA' is disposed around the display area DA'. The display area DA' may include a first display area DA1', a second display area DA2', and a third display area DA3'. The first display area DA1' is disposed between the second display area DA2' and the third display area DA3', and is an area having a relatively long scan line 141 extending in the first direction D1. The second display area DA2' and the third display area DA3' are areas having a relatively short scan line 141 compared to that of the first display area DA1'.

The driving circuit portion 130 may check the first display area DA1' through the register 134 described above in FIG. 3. In an alternative embodiment, the driving circuit portion 130 may check the first display area DA1' through the first input bump group 131-1 and the second input bump group 131-2 described above in FIG. 8. The driving circuit portion 130 may compensate for a data voltage to be inputted to the first display area DA1', or may compensate for a data voltage to be inputted to the second display area DAT and the third display area DA3' to generate a compensation data voltage.

Except for the above-described differences, the features of the embodiment described above with reference to FIGS. 1 to 9 may be entirely applied to the embodiment described with reference to FIG. 10, so that redundant descriptions are omitted.

Figure 11:
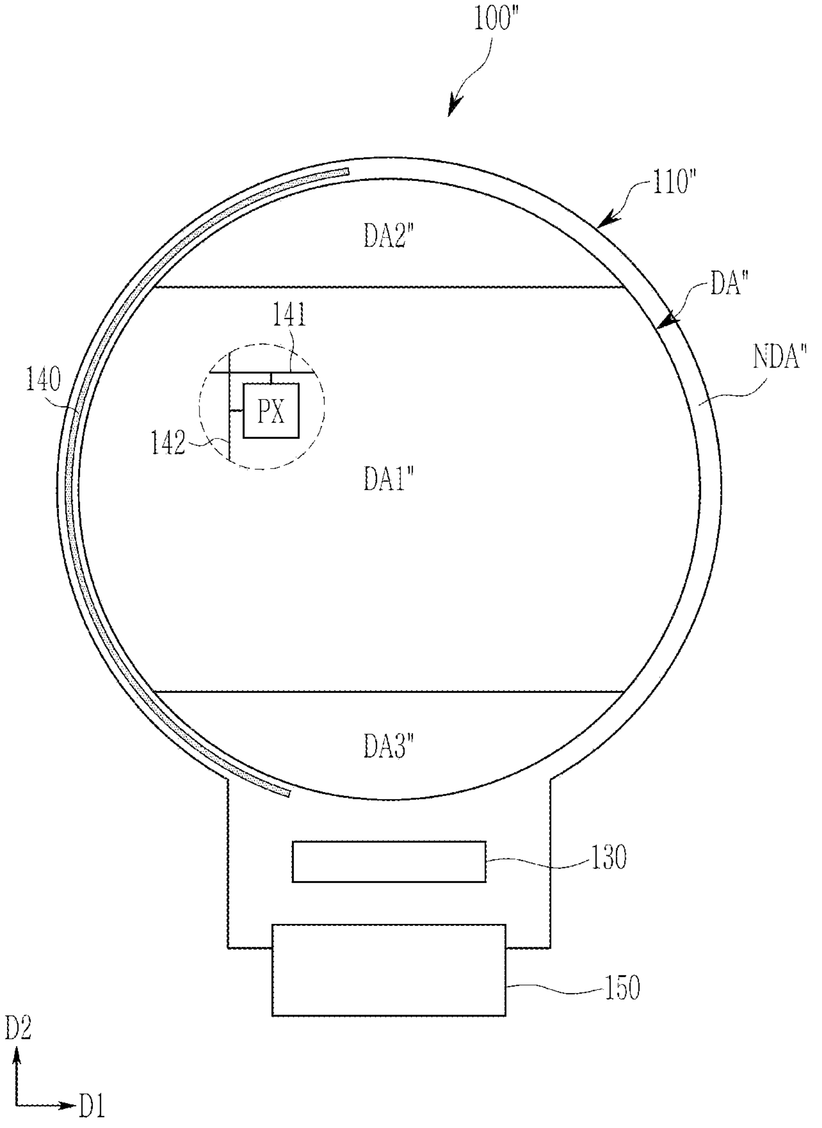
FIG. 11 illustrates a top plan view of another embodiment of a display device according to the invention.

FIG. 11 illustrates a top plan view of another embodiment of a display device according to the invention.

Referring to FIG. 11, a display device 100" may include a display panel 110", and the display panel 110" may include a circular display area DA". A non-display area NDA" is disposed around the display area DA". The display area DA" may include a first display area DA1", a second display area DA2", and a third display area DA3". The first display area DA1" is disposed between the second display area DA2" and the third display area DA3", and is an area having a relatively long scan line 141 extending in the first direction D1. The second display area DA2" and the third display area DA3" are areas having a relatively short scan line 141 compared to that of the first display area DA1".

The driving circuit portion 130 may check the first display area DA1" through the register 134 described above in FIG. 3. In an alternative embodiment, the driving circuit portion 130 may check the first display area DA1" through the first input bump group 131-1 and the second input bump group 131-2 described above in FIG. 8. The driving circuit portion 130 may compensate for a data voltage to be inputted to the first display area DA1", or may compensate for a data voltage to be inputted to the second display area DA2" and the third display area DA3" to generate a compensation data voltage.

Except for the above-described differences, the features of the embodiment described above with reference to FIGS. 1 to 5 may be entirely applied to the embodiment described with reference to FIG. 11, so that redundant descriptions are omitted.

While this invention has been described in connection with what is presently considered to be practical embodiments, it is to be understood that the invention is not limited to the disclosed embodiments, but, on the contrary, is intended to cover various modifications and equivalent arrangements. Therefore, those skilled in the art will understand that various modifications and other equivalent embodiments of the invention are possible. Consequently, the true technical protective scope of the invention must be determined based on the technical spirit of the appended claims.

What is claimed is:

1. A display device comprising:

a display area including a plurality of pixels; and a plurality of scan lines and a plurality of data lines connected to the plurality of pixels; and a driving circuit portion which includes a register including start scan line information and end scan line information of a first area of the display area and generates a compensation data voltage which compensates for a difference in length between the plurality of scan lines such that the compensation data voltage is inputted to a pixel of the plurality of pixels disposed in the first area through the plurality of data lines, based on the start scan line information indicating a start of the first area including scan lines of the plurality of scan lines, and the end scan line information indicating an end of the first area, wherein a general data voltage is applied to a pixel of the plurality of pixels disposed in a second area of the display area excluding the first area through the plurality of data lines, and the scan lines of the plurality of scan lines in the first area have lengths longer than lengths of scan lines of the plurality of scan lines in the second area.

2. The display device of claim 1, wherein a length of the scan lines included in the first area is relatively long compared to a length of a scan line of the plurality of scan lines disposed in the second area excluding the first area in the display area.

3. The display device of claim 1, wherein the driving circuit portion further includes a data generator which generates the compensation data voltage.

4. The display device of claim 1, wherein the driving circuit portion receives an image signal from a printed circuit board, inputs a general data voltage corresponding to the image signal to a pixel of the plurality of pixels disposed in the second area excluding the first area in the display area, and inputs the compensation data voltage generated by increasing or decreasing the general data voltage corresponding to the image signal to the pixel disposed in the first area.

5. The display device of claim 1, wherein the driving circuit portion inputs a general data voltage generated according to a reference gamma curve to a pixel of the plurality of pixels disposed in the second area excluding the first area in the display area, and inputs the compensation data voltage generated according to a first gamma curve different from the reference gamma curve to the pixel disposed in the first area.

6. The display device of claim 1, wherein the driving circuit portion inputs a general data voltage generated according to a reference voltage curve representing a data voltage with respect to a gray to a pixel of the plurality of pixels disposed in the second area of the display area excluding the first area, and inputs the compensation data voltage generated according to a first voltage curve different from the reference voltage curve to the pixel disposed in the first area.

7. The display device of claim 1, wherein the driving circuit portion includes:

a first input bump group which indicates the start scan line information; and a second input bump group which indicates the end scan line information, and the first input bump group and the second input bump group include a predetermined number of input bumps, while one of a ground voltage and a power source voltage is inputted to each of the plurality of input bumps included in the first input bump group and the second input bump group.

8. A driving apparatus for a display device, comprising:

an input bump portion which receives an image signal;

a data generator which generates a data voltage based on the image signal;

an output bump portion which transmits the data voltage to a display area including a plurality of pixels, and a plurality of scan lines and a plurality of data lines connected to the plurality of pixels; and a driving circuit portion which includes a register including start scan line information indicating a start of a first area including scan lines of the plurality of scan lines and end scan line information indicating an end of the first area, the first area being a portion of the display area, wherein the data generator increases or decreases a general data voltage corresponding to the image signal and generates a compensation data voltage such that the compensation data voltage is inputted to a pixel of the plurality of pixels disposed in the first area through the plurality of data lines, and the compensation data voltage compensates for a difference in length between the plurality of scan lines, a general data voltage is applied to a pixel of the plurality of pixels disposed in a second area of the display area excluding the first area through the plurality of data lines, and the scan lines of the plurality of scan lines in the first area have lengths longer than lengths of scan lines of the plurality of scan lines in the second area.

9. The driving apparatus for the display device of claim 8, wherein the data generator generates a compensation data voltage according to a first gamma curve different from a reference gamma curve for generating a general data voltage corresponding to the image signal such that the compensation data voltage is inputted to a pixel of the plurality of pixels disposed in the first area, and the compensation data voltage compensates for a difference in length between the plurality of scan lines.

10. The driving apparatus for the display device of claim 8, wherein the data generator generates a general data voltage corresponding to the image signal according to a reference voltage curve representing a data voltage with respect to a gray such that the general data voltage is inputted to a pixel of the plurality of pixels disposed in the second area excluding the first area in the display area, and the data generator generates a compensation data voltage according to a first voltage curve different from the reference voltage curve to input the compensation data voltage to a pixel of the plurality of pixels disposed in the first area, and the compensation data voltage compensates for a difference in length between the plurality of scan lines.

11. A driving apparatus for a display device, comprising:

an input bump portion which receives an image signal;

a data generator which generates a data voltage based on the image signal;

an output bump portion which transmits the data voltage to a display area including a plurality of pixels, and a plurality of scan lines and a plurality of data lines connected to the plurality of pixels; and a register including start scan line information and end scan line information of a first area of the display area, wherein the input bump portion includes:

a first input bump group including a predetermined number of input bumps of a plurality of input bumps which together indicate the start scan line information indicating a start of the first area including scan lines of the plurality of scan lines;

a second input bump group including a predetermined number of input bumps of the plurality of input bumps which together indicate the end scan line information indicating an end of the first area, and a compensation data voltage is inputted to a pixel of the plurality of pixels disposed in the first area through the plurality of data lines and a general data voltage is applied to a pixel of the plurality of pixels disposed in a second area of the display area excluding the first area through the plurality of data lines, and the scan lines of the plurality of scan lines in the first area have lengths longer than lengths of scan lines of the plurality of scan lines in the second area.

12. The driving apparatus for the display device of claim 11, wherein the predetermined number of the input bumps included in the first input bump group corresponds to a number of bits of the start scan line information, and the predetermined number of the input bumps included in the second input bump group corresponds to a number of bits of the end scan line information.

13. The driving apparatus for the display device of claim 11, wherein one of a ground voltage and a power source voltage is inputted to each of the plurality of input bumps included in the first input bump group and the second input bump group, and the start scan line information and the end scan line information are indicated with the ground voltage and the power source voltage.

14. A driving method of a display device, comprising:

receiving an image signal for displaying an image in a display area;

checking a first scan section corresponding to an area including a relatively long scan line among the display area;

converting an image signal corresponding to the first scan section among the image signals into first group data;

converting an image signal corresponding to a second scan section excluding the first scan section in the display area into second group data;

inputting the first group data to a plurality of pixels included in the first scan section while a scan signal of a gate-on voltage is applied to a scan line included in the first scan section; and inputting the second group data to a plurality of pixels included in the second scan section while a scan signal of a gate-on voltage is applied to a scan line included in the second scan section, wherein the first group data and the second group data include different data voltages with respect to a same gray, the first group data includes a compensation data voltage compensated by increasing or decreasing a general data voltage corresponding to the image signal, the second group data includes the general data voltage corresponding to the image signal, and the checking the first scan section includes:

checking the first scan section from a register including start scan line information indicating a start of the first scan section and end scan line information indicating an end of the first scan section.

15. The driving method of the display device of claim 14, wherein in the display area, a length of the scan line included in the first scan section and a length of the scan line included in the second scan section are different from each other.

16. The driving method of the display device of claim 14, wherein the checking the first scan section includes:

checking the start scan line information and the end scan line information indicated by a ground voltage and a power source voltage inputted to a first input bump group and a second input bump group which include a predetermined number of input bumps.

17. The driving method of the display device of claim 14, wherein the first group data includes a general data voltage corresponding to the image signal, and the second group data includes a compensation data voltage compensated by increasing or decreasing the general data voltage corresponding to the image signal.

* * * * *